United States Patent
Becker

(10) Patent No.: US 6,175,304 B1
(45) Date of Patent: Jan. 16, 2001

(54) LATCH SENSING SEATBELT BUCKLE

(75) Inventor: David L. Becker, White Lake, MI (US)

(73) Assignee: TRW Inc., Lyndhurst, OH (US)

(*) Notice: Under 35 U.S.C. 154(b), the term of this patent shall be extended for 0 days.

(21) Appl. No.: 09/310,559

(22) Filed: May 12, 1999

(51) Int. Cl.$^7$ ..................................... B60Q 1/00
(52) U.S. Cl. ...................... 340/457.1; 340/551; 180/268; 24/303; 24/642
(58) Field of Search ................. 340/457.1, 551, 340/552; 180/268, 270; 24/603, 633, 304, 303, 645, 642

(56) References Cited

U.S. PATENT DOCUMENTS

| | | | |
|---|---|---|---|
| 5,060,977 | 10/1991 | Saito | 280/802 |
| 5,406,252 | 4/1995 | Dear | 340/457.1 |
| 5,742,986 | 4/1998 | Corrion et al. | 24/633 |
| 5,752,299 | 5/1998 | Vivacqua et al. | 24/633 |
| 5,839,174 | 11/1998 | Chamings et al. | 24/633 |
| 5,898,366 * | 4/1999 | Brown et al. | 340/457.1 |
| 5,915,286 * | 6/1999 | Figi et al. | 73/865.9 |
| 5,960,523 * | 10/1999 | Husby et al. | 24/633 |
| 5,966,784 * | 10/1999 | Arbogast et al. | 24/633 |

FOREIGN PATENT DOCUMENTS

| | | |
|---|---|---|
| 3432088 | 2/1985 | (DE). |
| 62-189250 | 2/1987 | (JP). |

* cited by examiner

*Primary Examiner*—Daniel J. Wu
*Assistant Examiner*—Toan Pham
(74) *Attorney, Agent, or Firm*—Tarolli, Sundheim, Covell, Tummino & Szabo L.L.P.

(57) ABSTRACT

An apparatus includes a lockable element (16) and a buckle (12). The buckle (12) includes a base (28) that defines a passage (32) for receiving the lockable element (16), a latch (42), a Hall effect device (60), and a magnet (62). The latch (42) is movable from a non-locking position to a locking position in which it engages the lockable element (16). The magnet (62) is fixed to and moves with the latch (42). In the non-locking position, the latch (42) conducts low density magnetic flux from the magnet (62) to the Hall effect device (60). In the locking position, the latch (42) and the lockable element (16) conduct high density magnetic flux from the magnet (62) to the Hall effect device (60). The Hall effect device (60) thus has a first output when the latch (42) is in the non-locking position, and a second, different output when the latch (42) is in the locking position.

4 Claims, 2 Drawing Sheets

LATCH SENSING SEATBELT BUCKLE

FIELD OF THE INVENTION

The present invention relates to a seatbelt buckle. In particular, the present invention relates to a seatbelt buckle including a Hall effect device for sensing when the buckle is in a latched condition.

BACKGROUND OF THE INVENTION

A seatbelt system for restraining a vehicle occupant typically includes seatbelt webbing, a lockable element on the webbing, and a seatbelt buckle. The lockable element on the webbing is inserted in the buckle when the webbing has been placed about a vehicle occupant. A latch mechanism in the buckle interlocks with the lockable element to secure the webbing about the occupant. Such a seatbelt system may also include a Hall effect device for indicating whether or not the lockable element is locked in the buckle.

SUMMARY OF THE INVENTION

In accordance with the present invention, an apparatus comprises a lockable element made of a ferromagnetic material. A buckle receives and locks the lockable element in the buckle. The buckle comprises a base defining a passage into which the lockable element is insertable, and a latch moveable from a first position to a second position in which the latch locks the lockable element against movement in the passage. The latch is made of a ferromagnetic material.

The buckle also includes a Hall effect device which provides an output signal, the magnitude of which is dependent upon the flux density of a magnetic field acting on the Hall effect device. The buckle further includes a magnet fixed to the latch and moveable with the latch. The magnet creates a magnetic field of a first flux density that acts on the Hall effect device to cause the Hall effect device to provide a first output signal when the latch is in the first position. The magnet moves toward the Hall effect device when the latch moves to the second position. The magnet creates a magnetic field of a second flux density greater than the first flux density when the latch is in the second position to cause the Hall effect device to provide a second output signal greater than the first output signal.

The latch conducts the magnetic field of a first flux density, and the latch and the lockable element conduct the magnetic field of the second flux density. This causes the Hall effect device to have a first output when the latch is in the non-locking position, and to have a second, different output when the latch is in the locking position.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF PREFERRED EMBODIMENTS

Figure 1:
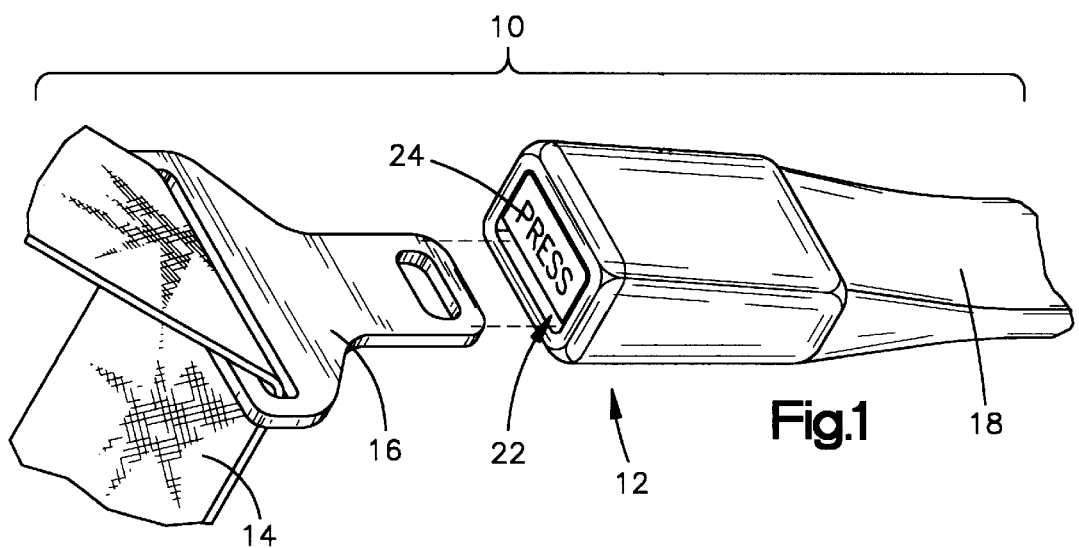
FIG. 1 is an isometric view of a vehicle occupant restraint apparatus comprising an embodiment of the present invention.

A vehicle occupant restraint apparatus 10 is shown in FIG. 1. The apparatus 10 includes a seatbelt buckle 12, seatbelt webbing 14, and a lockable element 16 on the webbing 14. The buckle 12 is anchored in a vehicle in a known manner, such as by a cable or anchor strap (not shown) extending within a cover 18. A latch mechanism 20 (shown schematically in FIG. 2) locks the lockable element 16 in the buckle 12 when the lockable element 16 is moved into an opening 22 at the end of the buckle 12. The lockable element 16 is subsequently released from the buckle 12 upon depression of a pushbutton 24 adjacent to the opening 22.

Figure 2:
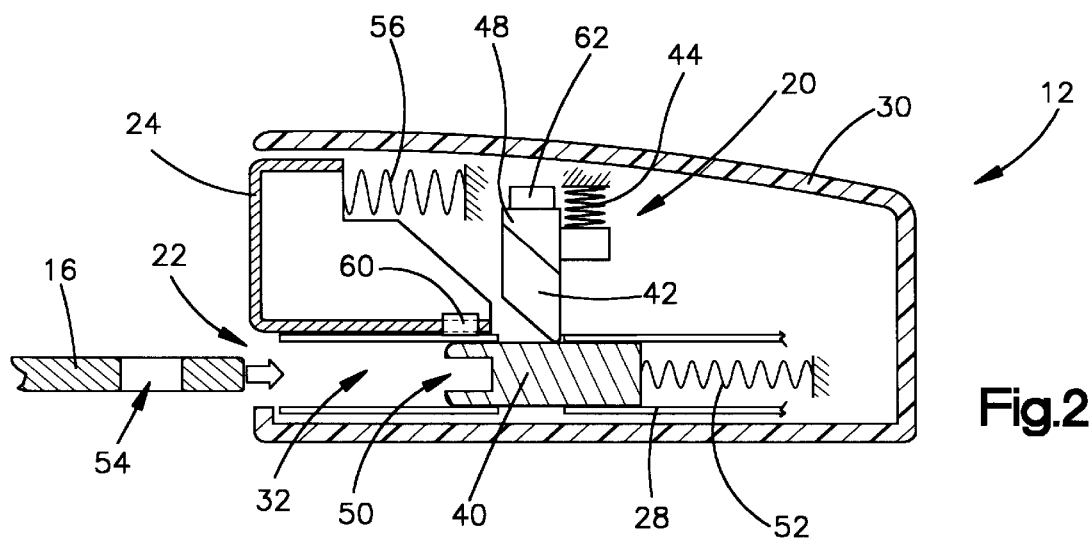
FIG. 2 is a side view, partly in section, of parts of the apparatus of FIG. 1, with certain parts being shown schematically.
Figure 3:
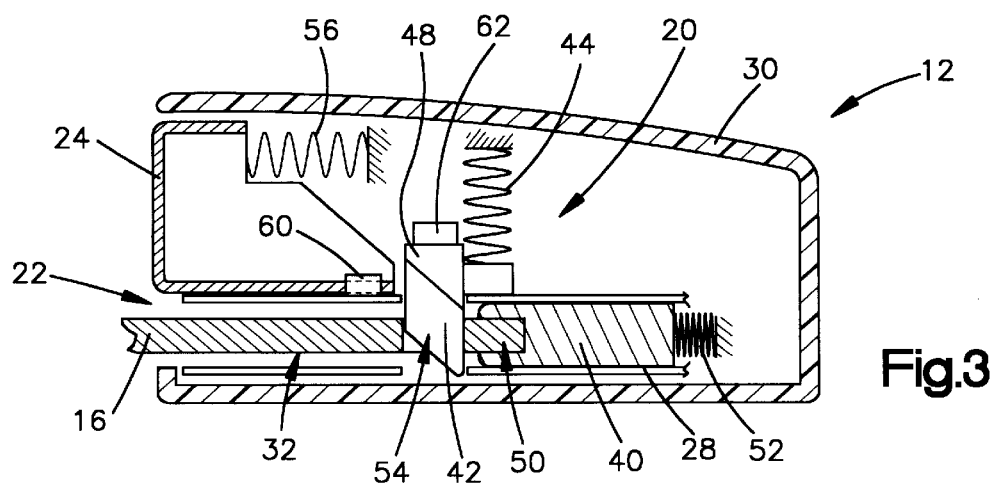
FIGS. 3 and 4 are views similar to FIG. 2 showing parts in different positions.
Figure 4:
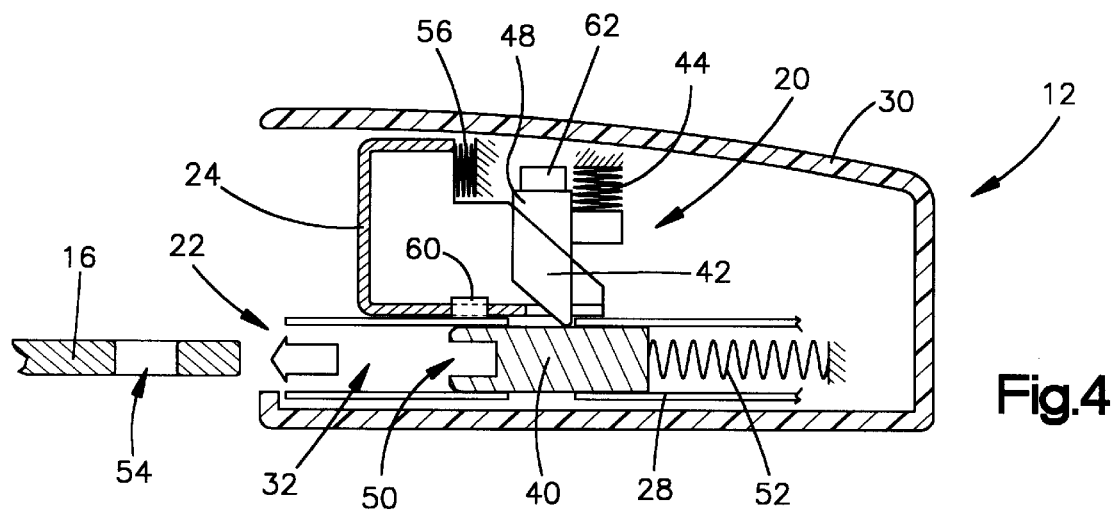

As shown in FIGS. 2–4, the buckle 12 includes a base 28 and a housing 30. The base 28 supports the latch mechanism 20 within the housing 30, and defines a passage 32 which receives the lockable element 16.

The latch mechanism 20 may comprise any suitable structure capable of releasably interlocking with the lockable element 16 in cooperation with the pushbutton 24. As shown by way of example in FIGS. 2–4, the latch mechanism 20 has a plurality of known parts including the pushbutton 24, an ejector 40, and a latch 42.

The latch 42 is movable between a non-locking position (FIG. 2) and a locking position (FIG. 3). A latch spring 44 engages the latch 42 and biases it toward the passage 32. The ejector 40 holds the latch 42 in the non-locking position against the bias the latch spring 44.

When the lockable element 16 is inserted through the opening 22, as indicated by the arrow shown in FIG. 2, it is moved into engagement with the ejector 40 in a notch 50 at the end of the ejector 40. The lockable element 16 is then moved inward against the ejector 40 so as to push the ejector 40 along the passage 32 from a forward position (FIG. 2) to a rearward position (FIG. 3) against the bias of an ejector spring 52.

As the lockable element 16 and the ejector 40 approach the positions of FIG. 3, an aperture 54 in the lockable element 16 moves into alignment with the latch 42. The latch spring 44 then moves the latch 42 downward to the locking position through the aperture 54 in the lockable element 16 so that the latch 42 blocks removal of the lockable element 16 from the buckle 12.

When the lockable element 16 is to be released from the buckle 12, the pushbutton 24 is moved from the position of FIG. 3 to the position of FIG. 4 against the bias of a pushbutton spring 56. The pushbutton 24 engages, or may be linked with, the latch 42 in a known manner so as to move the latch 42 back out of the aperture 54 in the lockable element 16 against the bias of the latch spring 44. The ejector spring 52 then moves the ejector 40 back outward along the passage 32 toward the opening 22 to eject the lockable element 16 from the buckle 12 as shown by the arrow in FIG. 4.

The base 28 supports a Hall effect device 60 within the housing 30. A magnet 62 is fixed to the upper portion 48 of the latch 42. The latch 42 is made of a ferromagnetic material. The magnet 62 may be fixed to the latch 42 with a suitable adhesive. The magnet 62 moves with the latch 42.

When the latch 42 is in the non-locking position of FIG. 2, the magnet 62 and the latch 42 are in positions spaced apart from the Hall effect device 60. This is best shown in the enlarged view of FIG. 5. In this arrangement, the latch 42 and an adjacent portion 72 of the base 28 define a path for conducting a magnetic field between the north and south poles 74 and 76 of the magnet 62. This magnetic field is indicated generally by the arrows shown in FIG. 5.

In the non-locking position, there is an air gap 80 between the north pole 74 of the magnet 62 and the Hall effect device 60. There is also an air space 82 within the passage 32 along the adjacent portion 72 of the base 28.

In the non-locking position, the magnetic field conducted between the north and south poles 74 and 76 of the magnet 62 has a relatively low flux density. Several factors contribute to the low flux density of the magnetic field including the spaced apart distance between the magnet 62 and the Hall effect device 60, the spaced apart distance between the latch 42 and the Hall effect device 60, the large size of the air gap 80, and the large size of the air space 82. As a result, the Hall effect device 60 has a low (or off) condition with a corresponding low output when the lockable element 16 is not locked in the buckle 12.

As the lockable element 16 is inserted into the passage 32 and approaches the locking position of FIG. 3, the magnet 62 and latch 42 maintain their spaced apart position with respect to the Hall effect device 60. When the aperture 54 in the lockable element 16 becomes aligned with the latch 42, the latch 42 moves to the locking position of FIG. 3 and the magnet 62 and latch 42 are thus positioned spaced close to the Hall effect device 60. This is best shown in the enlarged view of FIG. 6. When the parts are in the position shown in FIG. 6, the latch 42, the lockable element 16, and the adjacent portion 72 of the base 28 define a path for conducting a magnetic field between the north and south poles 74 and 76 of the magnet 62. This magnetic field is indicated generally by the arrows shown in FIG. 6.

Figure 5:
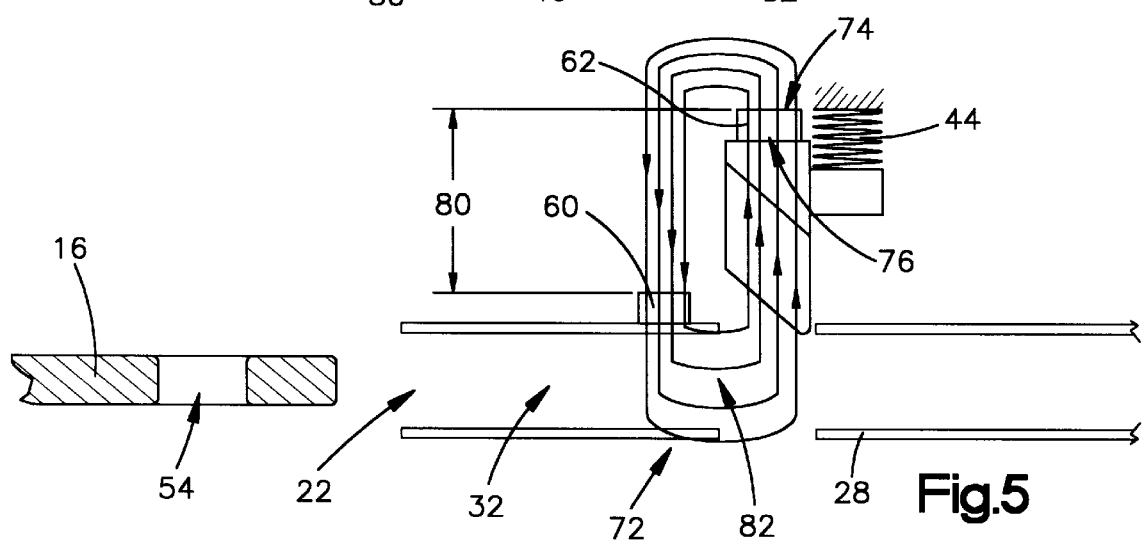
FIG. 5 is an enlarged schematic view of parts shown in FIG. 2.
Figure 6:
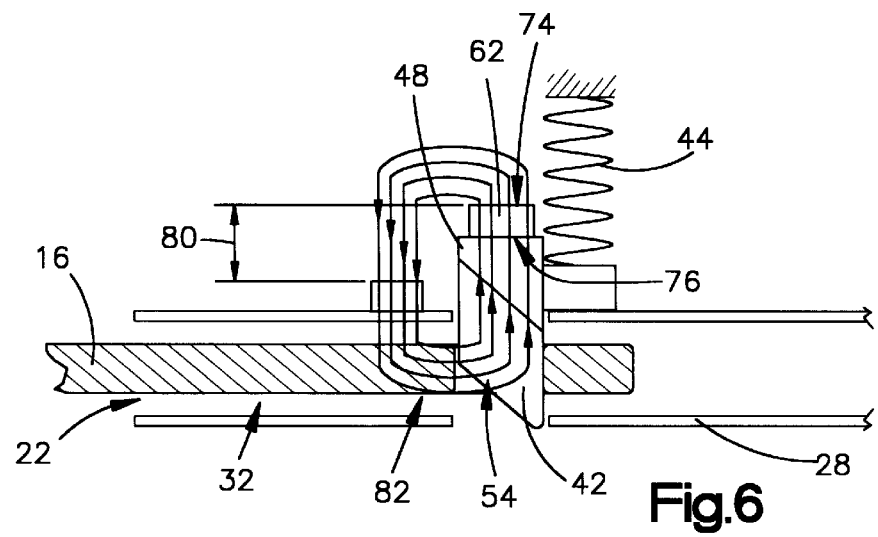
FIG. 6 is a view similar to FIG. 5 showing parts in different positions.

The distances between the magnet 62 and the Hall effect device 60 and between the latch 42 and the Hall effect device 60 in the locking position of FIG. 6 are less than the respective distances in the non-locking position of FIG. 5. The size of the air gap 80 in the locking position of FIG. 6 is smaller than the air gap 80 in the non-locking position of FIG. 5. Furthermore, in the locking position, the air space 82 in the passage 32 is substantially filled by the lockable element 16, which is made of a ferromagnetic material. The magnetic field provided by the magnet 62 is conducted along the path of FIG. 6 when the latch 42 is in the locking position.

In the locking position, a magnetic field having a relatively high flux density is conducted between the north and south poles 74 and 76 of the magnet 62 through a path defined by the latch 42, the lockable element 16 and the adjacent portion 72 of the base 28. Several factors contribute to the high flux density of the magnetic field including the close distance between the magnet 62 and the Hall effect device 60, the close distance between the latch 42 and the Hall effect device 60, the small size of the air gap 80, and the presence of the lockable element 16 within the air space 82. As a result, the Hall effect device 60 has a high (or on) condition with a corresponding high output when the lockable element 16 is locked in the buckle 12.

The Hall effect device 60 is thus switched from a first condition with a first output to a second, different condition with a correspondingly different output upon locking of the lockable element 16 in the buckle 12 by the latch 42.

The Hall effect device 60 can be used to alert a vehicle occupant to the locked or unlocked condition of the lockable element 16 and buckle 12. For example, an audible alarm or a lamp on the vehicle instrument panel could be activated in response to the output of the Hall effect device 60 to alert a vehicle occupant if the lockable element 16 is not locked in the buckle 12.

The Hall effect device 60 can also be used to control one or more vehicle occupant protection devices. For example, the Hall effect device 60 can be included in a deployment system with an inflatable vehicle occupant protection device. The Hall effect device 60 can be used to control the inflation of the protection device depending upon the buckled or unbuckled condition of the seatbelt. The inflatable device can be any one of several different types of inflatable vehicle occupant protection devices known in the art. Such inflatable devices include air bags, inflatable seatbelts, inflatable knee bolsters, inflatable head liners, and knee bolsters operated by air bags, and/or seatbelt pretensioners.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a lockable element made of a ferromagnetic material; and a buckle for receiving and locking said lockable element in said buckle, said buckle comprising:

a base defining a passage into which the lockable element is insertable;

a latch moveable from a first position to a second position in which said latch locks said lockable element against movement in said passage, said latch being made of a ferromagnetic material;

a Hall effect device which provides an output signal, the magnitude of which is dependent upon the flux density of a magnetic field acting on said Hall effect device; and a magnet fixed to said latch and moveable with said latch, said magnet being spaced away from said Hall effect device when said latch is in said first position, said magnet creating a magnetic field of a first flux density acting on said Hall effect device to cause said Hall effect device to provide a first output signal when said latch is in said first position;

said magnet moving toward said Hall effect device when said latch moves to said second position, said magnet creating a magnetic field of a second flux density greater than said first flux density when said latch is in said second position to cause said Hall effect device to provide a second output signal greater than said first output signal;

said latch conducting said magnetic field of a first flux density, and said latch and said lockable element conducting said magnetic field of a second flux density.

2. Apparatus as defined in claim 1 wherein said lockable element has a portion which extends in said passage from said latch to adjacent to said Hall effect device.

3. Apparatus as defined in claim 2 wherein said latch has first and second opposite end portions, wherein said magnet is fixed to the latch at said first end portion, and said second end portion locks said insertable member against movement in said passage.

4. Apparatus as defined in claim 2 wherein said lockable element is inserted into said passage in a first direction and said latch and said Hall effect device are spaced apart in said first direction.

* * * * *